(12) United States Patent
Zhao et al.

(10) Patent No.: US 11,213,732 B2
(45) Date of Patent: Jan. 4, 2022

(54) SPLICING FLOOR OMNIDIRECTIONAL TREADMILL PLATFORM

(71) Applicant: Siyan Zhao, Chengdu (CN)

(72) Inventors: Siyan Zhao, Chengdu (CN); Shulong Zhao, Chengdu (CN)

(73) Assignee: Siyan Zhao, Chengdu (CN)

( * ) Notice: Subject to any disclaimer, the term of this patent is extended or adjusted under 35 U.S.C. 154(b) by 17 days.

(21) Appl. No.: 16/910,091

(22) Filed: Jun. 24, 2020

(65) Prior Publication Data

US 2021/0113904 A1 Apr. 22, 2021

(30) Foreign Application Priority Data

Apr. 26, 2019 (CN) .......................... 201910344458.1

(51) Int. Cl.
*A63B 69/00* (2006.01)
*B25J 11/00* (2006.01)
(Continued)

(52) U.S. Cl.
CPC ......... *A63B 69/0035* (2013.01); *B25J 11/003* (2013.01); *A63B 22/0285* (2013.01);
(Continued)

(58) Field of Classification Search
CPC . A63B 69/0035; A63B 22/02; A63B 22/0285; A63B 22/0207; A63B 22/0214; A63B 22/0221; A63B 22/0228; A63B 22/0235; A63B 22/0242; A63B 22/025; A63B 22/0257; A63B 22/0264; A63B 22/0292; A63B 22/20; A63B 22/203; A63B 22/208; A63B 2022/0271; A63B 2022/0278; A63B 24/0021; A63B 2209/00; B25J 11/003
(Continued)

(56) References Cited

U.S. PATENT DOCUMENTS

| | | | |
|---|---|---|---|
| 7,150,704 B2 * | 12/2006 | Schaeffer | A63B 22/00 482/148 |
| 7,520,836 B2 * | 4/2009 | Couvillion, Jr. | G09B 19/00 482/8 |

(Continued)

*Primary Examiner* — Megan Anderson
(74) *Attorney, Agent, or Firm* — Bayramoglu Law Offices LLC (57) ABSTRACT

An omnidirectional treadmill platform includes a splicing floor, an omnidirectional driving base and a floor removing/splicing actuator. A plurality of omnidirectional wheels are arranged in the driving base. The splicing floor is placed on the omnidirectional wheels. A user moves on the splicing floor, and the omnidirectional wheels of the driving base cause the splicing floor to move in a direction Opposite to the movement direction of the user thus enabling the user to experience unlimited free movement, while in reality remaining in place. The splicing floor is formed by splicing a plurality of splicing blocks. The floor removing/splicing actuator removes and splices the splicing blocks at right positions, recycling splicing blocks and achieving the unlimited extension of the splicing floor. The new platform provides unrestricted movement and variable ground surface simulation irrespective of turn radius with near-negligible inertia force without the use of special footwear.

7 Claims, 6 Drawing Sheets

(51) Int. Cl.
 *A63B 22/02* (2006.01)
 *A63B 24/00* (2006.01)
(52) U.S. Cl.
 CPC ... *A63B 24/0021* (2013.01); *A63B 2022/0271* (2013.01); *A63B 2022/0278* (2013.01); *A63B 2209/00* (2013.01)
(58) Field of Classification Search
 USPC .................................................. 193/35 MD
 See application file for complete search history.

(56) References Cited

U.S. PATENT DOCUMENTS

| | | | | |
|---|---|---|---|---|
| 7,682,291 | B2* | 3/2010 | Gill | A63B 22/0235 |
| | | | | 482/54 |
| 9,329,681 | B2* | 5/2016 | Goetgeluk | A63B 71/0622 |
| 10,101,805 | B2* | 10/2018 | Choi | G06F 3/011 |
| 2016/0024781 | A1* | 1/2016 | Flessas | G06F 1/1601 |
| | | | | 414/816 |
| 2019/0224521 | A1* | 7/2019 | Olsson | A63B 22/025 |

* cited by examiner

SPLICING FLOOR OMNIDIRECTIONAL TREADMILL PLATFORM

CROSS REFERENCE TO THE RELATED APPLICATIONS

This application is based upon and claims priority to Chinese Patent Application No. 201910344458.1, filed on Apr. 26, 2019, the entire contents of which are incorporated herein by reference.

TECHNICAL FIELD

The present invention relates to virtual reality technology, and more particularly, to an omnidirectional treadmill platform that provides an unlimited free-walking space in a limited physical space and simulates a variable ground surface environment.

BACKGROUND

Treadmills simulating bipedal movement of human beings in virtual reality (VR) are constantly evolving. Omnidirectional treadmills allow the user to move in any horizontal direction, and the speed and direction can change in real time with the user's movement and foot placement. In other words, the user has unlimited free-walking space.

Prior omnidirectional treadmills can be divided into two main types: passive and active.

The implementation solutions of passive omnidirectional treadmills may be divided into three types: (i) the concave in-situ slide type, (ii) the flat in-situ slide type, and (iii) the rolling ball-inside walk type, each of which is unrelated to the implementation solution of the present invention and are, therefore, not described herein.

The implementation solutions of the active omnidirectional treadmills include:

A first implementation, which uses conveyors. A large conveyor belt nests a small conveyor perpendicular to the large conveyor belt, which is easy to control. Only the bi-directional speed of the conveyor belts is controlled to accomplish the resultant speed. Substantial inertia, however, accompanies the conveyor implementation. Since the small conveyor belt as a whole is arranged on the large conveyor belt, the large conveyor has substantial rotatory inertia. The system lacks flexibility as a result.

A second implementation of the active type of omnidirectional treadmill employs a spiral device driven by a plurality of motors. In this way, the implementation has the advantage of improved linear motion synchronization, but the disadvantage that the movement direction and the movement speed of the user are not in synchrony.

There is also the solution of roller arrays, which have the disadvantage that users are required to wear special footwear.

Other implementation solutions, such as the mobile floor type and the ball-shaped inner-surface locomotion type, are unrelated to the technical direction and principles of the present disclosure and are thus not described herein.

Previous VR simulation platforms cannot achieve effective simulation of variable ground surface and environment. Consequently, user's are left with an experience far removed from one that is real, and the special footwear requirement of most systems adds complications and inconvenience to the operation of the platform.

SUMMARY

To solve disadvantages in the prior arts, the present invention provides a splicing floor omnidirectional treadmill platform, which effectively solves the above-mentioned problems in the prior art.

To achieve the objective, the present invention adopts the following technical solution.

A splicing floor omnidirectional treadmill platform includes a splicing floor, an omnidirectional driving base, a floor removing/splicing actuator. A plurality of omnidirectional wheels are arranged in the omnidirectional driving base. The splicing floor is placed on the omnidirectional wheels. A user moves on the splicing floor, and the omnidirectional wheels of the omnidirectional driving base drive the splicing floor as a whole to move in a direction opposite to a movement direction of the user, enabling the user to experience unlimited free movement, while in reality, remaining in place.

The splicing floor is formed by splicing a plurality of splicing blocks. During a splicing process, the splicing blocks are connected to form a whole in the vertical direction and the horizontal direction. During a removing process, the splicing blocks can be removed without destruction for recycling.

The floor removing/splicing actuator is installed around the omnidirectional driving base, and is configured to pick, remove and splice the splicing blocks. The floor removing/splicing actuator removes a floor portion moving out of a boundary of the splicing floor, and splices a floor portion moving into the boundary of the splicing floor. The splicing blocks are recycled to achieve an unlimited extension of the splicing floor.

Further, by means of the passive splicing method, the splicing block is designed to be a fully locked puzzle graphic. Two adjacent splicing blocks are nested together by a fully locked structure to be firmly fixed on the horizontal plane. The adjacent splicing blocks are fixed by the positioning bead. And the positioning bead provides the positioning function in the vertical direction and the weak fixing function in the vertical direction. This structure is simple and has a low cost, and the splicing blocks are firmly connected in the horizontal direction. In addition, the splicing blocks are removably secured in the vertical direction, and thus the splicing blocks can only be removed and spliced in the vertical direction.

Further, by means of the active splicing method, the splicing block is designed as a square splicing block. Four electrically controlled calipers are installed inside each splicing block, and a clamping post corresponding to the electrically controlled caliper is arranged on each side of the splicing block. When the caliper is open, the caliper can be fully retracted inside the splicing block. When the caliper is closed, the caliper can extend out of the splicing block to clamp the clamping post of the corresponding splicing block. The splicing blocks are fixedly connected in the horizontal direction and the vertical direction by the electrically controlled caliper, and two adjacent splicing blocks are locked and unlocked by wireless signal control to achieve the removing and splicing of the splicing blocks. The electrically controlled caliper includes a micro-electric push rod, a connector and a caliper head. The head of the micro-electric push rod is connected to the diamond-shaped connector, and the connector is connected to the caliper head. The micro-electric push rod drives the connector to move to cause the opening and closing of the caliper head.

Further, the omnidirectional driving base includes a base frame, the omnidirectional wheels, shafts, gears, motors, traction wheels and traction belts.

A plurality of shafts and a plurality of vertical shafts are arranged in the base frame. The horizontal shafts and the vertical shafts are not on a same horizontal plane and do not interfere with one another. The horizontal shafts are parallel to each other and have a same spacing. The vertical shafts are parallel and have a same spacing. The plurality of omnidirectional wheels are arranged in the shafts. A diameter of the omnidirectional wheels on the horizontal shafts is different from a diameter of the omnidirectional wheels on the vertical shafts, so that the highest part of all the omnidirectional wheels can be maintained on a same horizontal plane. The gear is arranged on one shaft of the horizontal shafts and one shaft of the vertical shafts. The gear is engaged with a motor gear of the motor. All the horizontal shafts and the vertical shafts are provided with the traction wheel, and all the traction wheels are connected to each other by the traction belt. The gear is driven by the motor to rotate to further drive the traction wheels and the traction belt to rotate, so that all the shafts can rotate, thereby achieving omnidirectional driving.

Further, in order to make the base frame more secure, the base frame is divided into a plurality of square grids. Four sidewalls of the square grid are provided with a shaft hole, and the shaft is inserted into the shaft hole to strengthen the entire base frame.

Further, in order to expand the omnidirectional driving base and to better move the splicing blocks, a plurality of single omnidirectional driving modules can be spliced together at the outside of the omnidirectional driving base to separately drive the splicing blocks to move in each direction.

The single omnidirectional driving module includes a module frame, the two omnidirectional wheels, the shafts, the two gears and the two motors. One horizontal shaft and one vertical shaft are arranged in the base frame. The horizontal shaft and the vertical shaft do not interfere with each other. Two omnidirectional wheels are arranged on the two shafts, respectively. The highest parts of the two omnidirectional wheels are on a same horizontal plane. The gear is arranged on the horizontal shaft and the vertical shaft, and the gear is engaged with the motor gear of the motor. The gear is driven by the motor to rotate to further drive the traction wheel to rotate.

Further, surface layers of different materials are arranged on the surface of each splicing block. The surface layers are configured to simulate various ground surfaces and environments, so that the user can experience different ground effects. Various types of the splicing blocks are combined to stimulate a ground with different surfaces.

Compared with the prior art, the present invention has the following advantages. The present invention provides unrestricted movement and variable ground surface simulation irrespective of turn radius with near-negligible inertia force without the use of special footwear.

DETAILED DESCRIPTION OF THE EMBODIMENTS

In order to make the objectives, technical solutions and advantages of the present invention more clearly, the present invention is described in detail hereinafter in conjunction with the embodiments with reference to the drawings.

Figure 1:
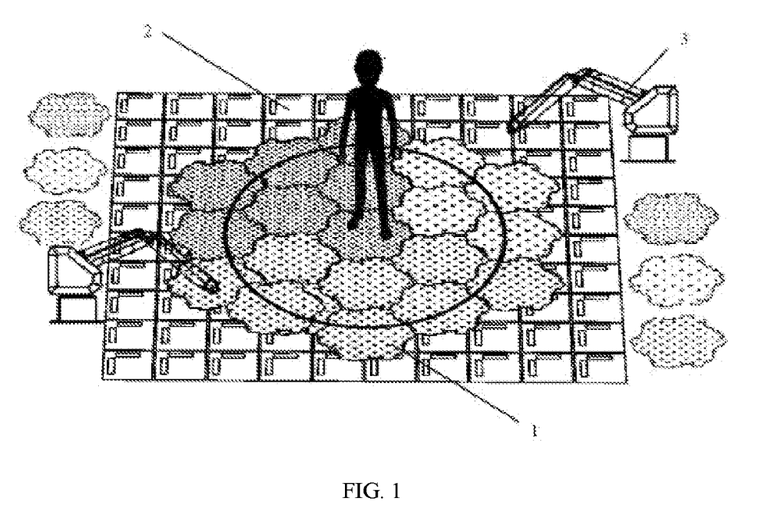
FIG. 1 is a schematic diagram of the present invention.

As shown in FIG. 1, a splicing floor omnidirectional treadmill platform includes the splicing floor 1, the omnidirectional driving base 2, and the floor removing/splicing actuator 3. The splicing floor 1 is arranged on the omnidirectional driving base 2. User moves on the middle of the splicing floor 1, and the omnidirectional driving base 2 drives the splicing floor 1 as a whole to move in the direction opposite to the movement direction of the user, enabling the user to experience unlimited free movement, while in reality, remaining in place. The floor removing/splicing actuator 3 is configured to remove a floor portion that moves out of the boundary and to timely splice a floor portion that will enters the boundary.

By means of the passive splicing method, the splicing floor 1 is formed by splicing a plurality of splicing blocks 4. During the splicing process, the splicing blocks are connected to a whole with a sufficient strength in the vertical direction and the horizontal direction. During the removing process, the splicing blocks can be removed without destruction for recycling. The splicing blocks are implemented in two ways: passive splicing blocks or active splicing blocks.

Figure 2:
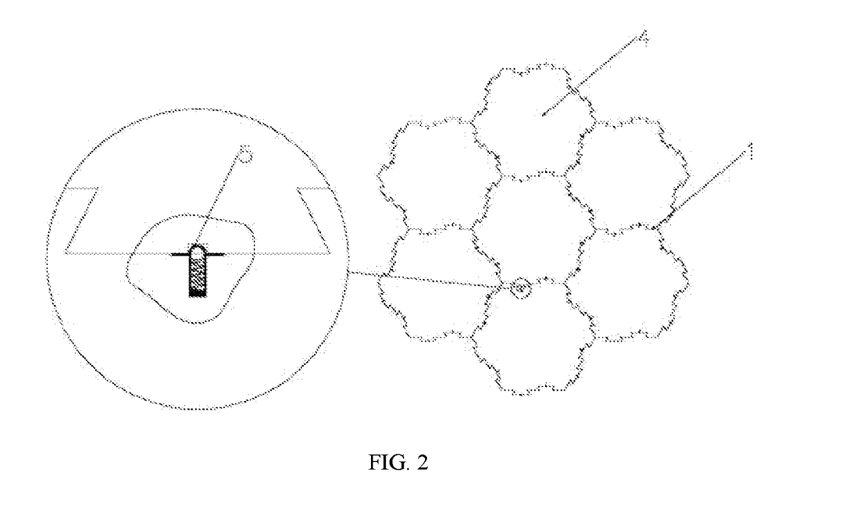
FIG. 2 is a schematic diagram showing the structure of a passive splicing floor according to an embodiment of the present invention.

As shown in FIG. 2, the passive splicing blocks 4 are designed to be a fully locked puzzle graphics ("full locked" is a term in the puzzle, meaning that puzzles can be nested together and are firmly fixed on the horizontal plane. FIG. 2 only shows one implementation of the fully locked puzzle graphics. Fully locked puzzles of other shapes are also available, and it is not necessary for every splicing block to be a uniform shape. The two adjacent splicing blocks 4 are nested in each other by a fully-locked structure to be firmly fixed on the horizontal plane. Adjacent splicing blocks 4 are fixed by the positioning bead 5 (also known as a ball-joint plunger or spring-loaded plunger).

The positioning bead 5 provides the positioning function and the removable fixing function in the vertical direction. This structure is easy to handle and has a low cost, and the splicing blocks are firmly connected, or secured, in the horizontal direction. In addition, the splicing blocks are weakly, or removably, fixed in the vertical direction, and thus the splicing blocks can only be removed and spliced in the vertical direction.

Figure 3:
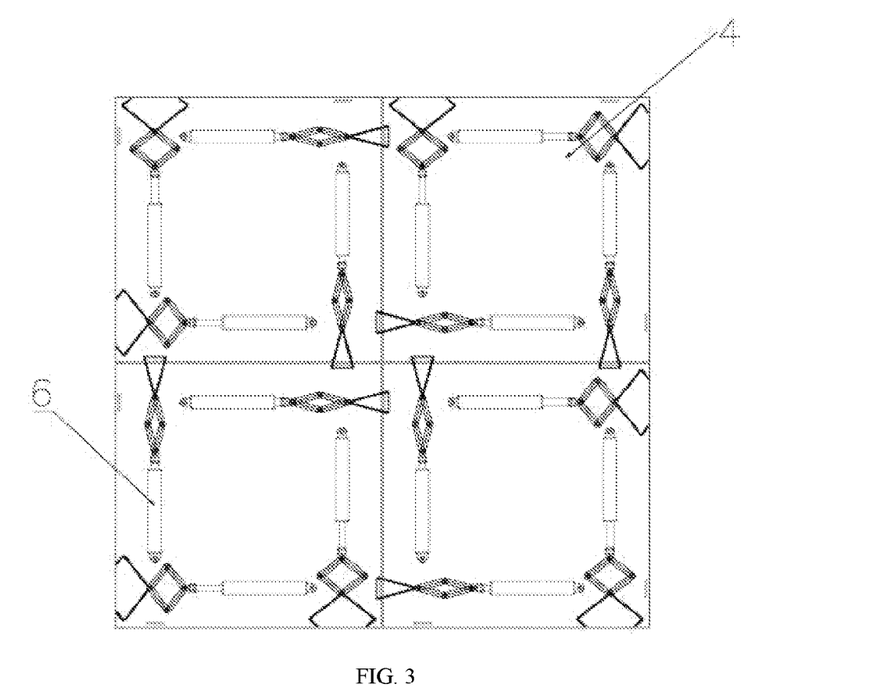
FIG. 3 is a schematic diagram showing the structure of an active splicing floor according to an embodiment of the present invention.

As shown in FIG. 3, various sizes of complete floor area can be formed by splicing active splicing blocks and square splicing blocks. The active splicing blocks do not need to be designed as fully locked graphics (FIG. 3 only shows one implementation. Non-fully locked puzzle patterns of any other shapes are also available, and it is not necessary for every splicing block to be uniform shape).

By means of the active splicing method, the four electrically controlled calipers 6 are installed inside each active splicing block 4, the clamping post corresponding to the electrically controlled caliper 6 is arranged on each side of the splicing block 4. When the caliper is open, the caliper can be fully retracted inside the splicing block. When the caliper is closed, the caliper can extend out of the splicing block 4 to clamp the clamping post of the corresponding splicing block 4. The splicing blocks are fixedly connected in the horizontal direction and the vertical direction by the electrically controlled caliper 6, and two adjacent splicing blocks are locked and unlocked by wireless signal control to achieve the removing and splicing of the splicing blocks.

Figure 4:
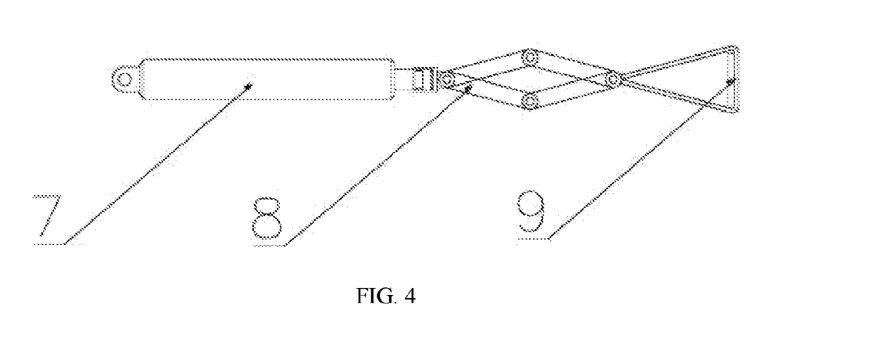
FIG. 4 is a schematic diagram showing the structure of an electrically controlled caliper according to an embodiment of the present invention.

The detailed structure and principle of the electrically controlled caliper 6 are shown in FIG. 4. The head of the micro-electric push rod 7 is connected to the diamond-shaped connector 8, and the connector 8 is connected to the caliper head 9. The micro-electric push rod 7 drives the connector 8 to move to cause the opening and closing of the caliper head 9.

The micro-powered push rod 7 is driven by the internal battery (the battery can be charged regularly or online wirelessly) or is driven by a wireless power supply. As a general technology, it will not be described further herein.

By means of the active splicing method, the splicing blocks are firmly connected in both horizontal and vertical directions, can withstand the strenuous exercise of the user, and can be removed and spliced on a same horizontal plane.

The omnidirectional driving base 2 includes a plurality of omnidirectional driving wheels that are installed upward. By controlling the rotation speed and direction of each driving wheel, the splicing floor 1 on the omnidirectional driving wheels is driven to move in the desired direction and speed, which realizes the omnidirectional driving.

Figure 5:
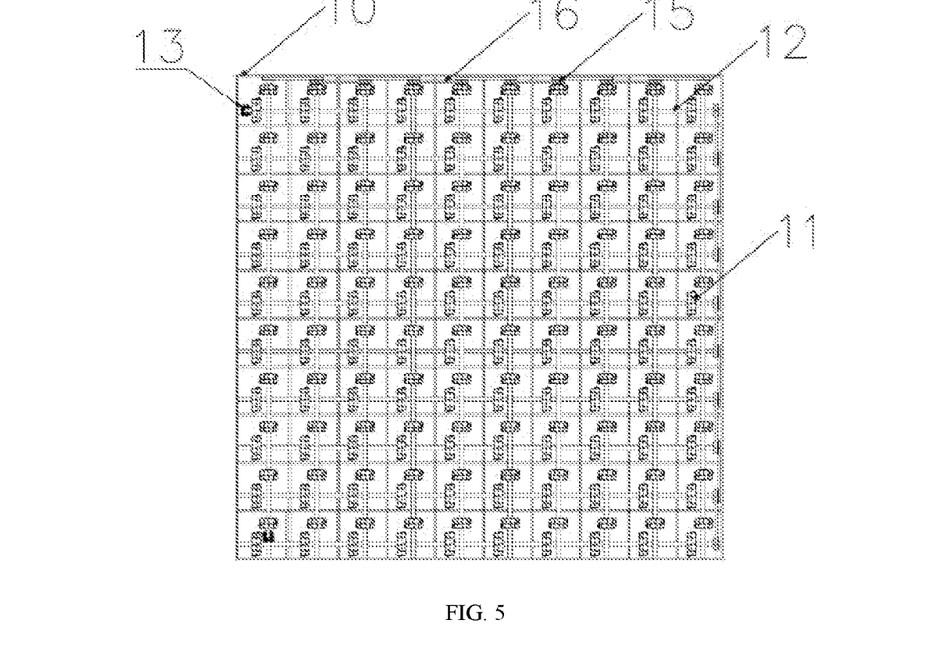
FIG. 5 is a schematic diagram showing the structure of an omnidirectional driving base.
Figure 6:
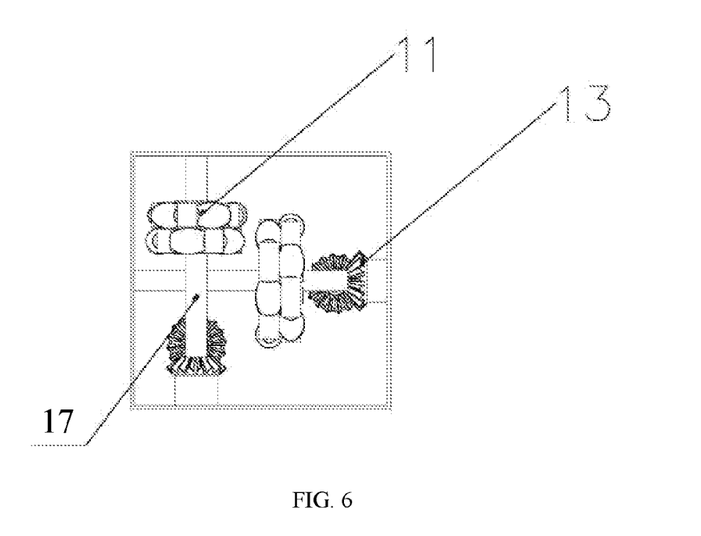
FIG. 6 is a schematic diagram showing the structure of a single omnidirectional driving module.
Figure 7:
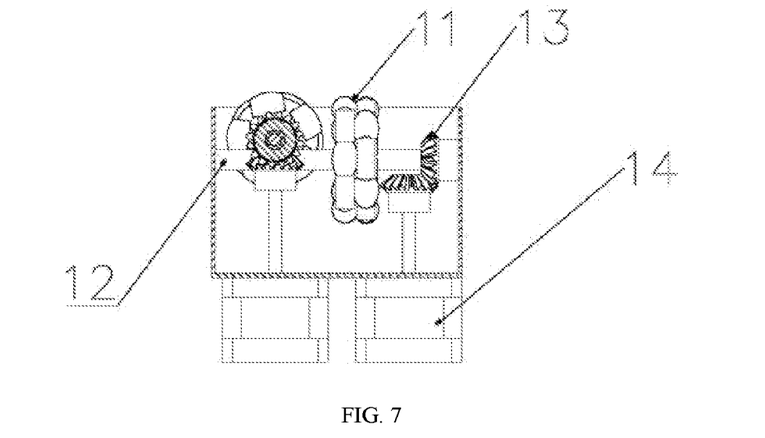
FIG. 7 is a schematic diagram showing the matching structure of the shaft and the motor of the omnidirectional driving base.

As shown in FIGS. 5-7, specifically, the driving base 2 includes the base frame 10, the omnidirectional wheels 11, a plurality of horizontal shafts 12, a plurality of vertical shafts 17, gears 13, motor 14, traction wheel 15 and traction belt 16.

A plurality of horizontal shafts 12 and a plurality of vertical shafts 17 are arranged in the base frame 10. The horizontal shafts 12 and the vertical shafts 17 are not on a same horizontal plane and do not interfere with one another. The horizontal shafts 12 are parallel to each other and have the same spacing. The vertical shafts 17 are parallel and have the same spacing. A plurality of omnidirectional wheels 11 are arranged on the horizontal shafts 12 and the vertical shafts 17. The diameter of the omnidirectional wheels 11 on the horizontal shafts is different from the diameter of the omnidirectional wheels 11 on the vertical shafts, so that the highest parts of the all omnidirectional wheels 11 can be maintained on a same horizontal plane. The gear 13 is arranged on one shaft of the horizontal shafts 12 and one shaft of the vertical shafts 17, respectively, and the gear 13 is engaged with the motor gear of the motor 14. All the horizontal shafts and the vertical shafts are provided with the traction wheel 15, and all the traction wheels 15 are connected to each other by the traction belt 16. The gear 13 is driven by the motor to rotate to further drive the traction wheels 15 and the traction belt 16 to rotate, so that all the shafts 12 can rotate, thereby achieving omnidirectional driving.

To make the base frame 10 more secure, the base frame 10 is divided into a plurality of square grids. Four sidewalls of the square grid are provided with a shaft hole. and the shaft 12 is inserted into the shaft hole to strengthen the entire base frame 10.

As shown in FIGS. 6-7, the single omnidirectional driving module includes the module frame, the omnidirectional wheels 11, shaft 12, gears 13, and motors 14. One horizontal shaft 12 and one vertical shaft 17 are arranged in the base frame 10. The horizontal 12 shaft and the vertical shaft 17 do not interfere with each other. Two omnidirectional wheel 11 are arranged on the two shafts 12, respectively. The highest parts of the two omnidirectional wheels are on the same horizontal plane. The horizontal 12 shaft and the vertical shaft 17 are provided with the gear 13, and the gear 13 is engaged with the motor gear of the motor 14. The gear 13 is driven by the motor to rotate to further drive the traction wheel 15 to rotate.

Figure 8:
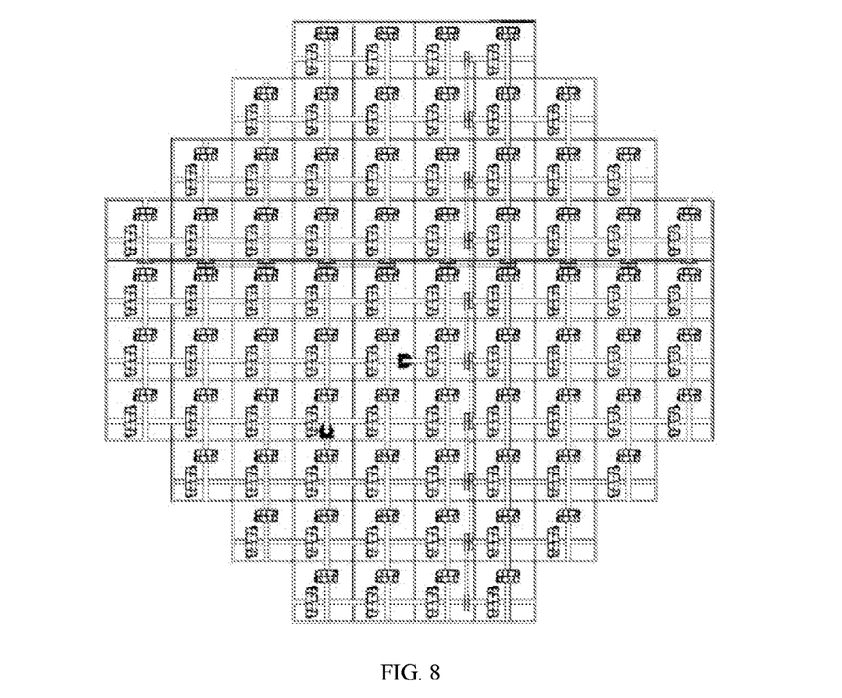
FIG. 8 is a schematic diagram showing the structure of the 76-square grids-linked omnidirectional driving base.

As shown in FIGS. 5-6, and 8, the overall shape of the base frame 10 allows for the design of omnidirectional driving base modules in different sizes and shapes as needed.

Figure 9:
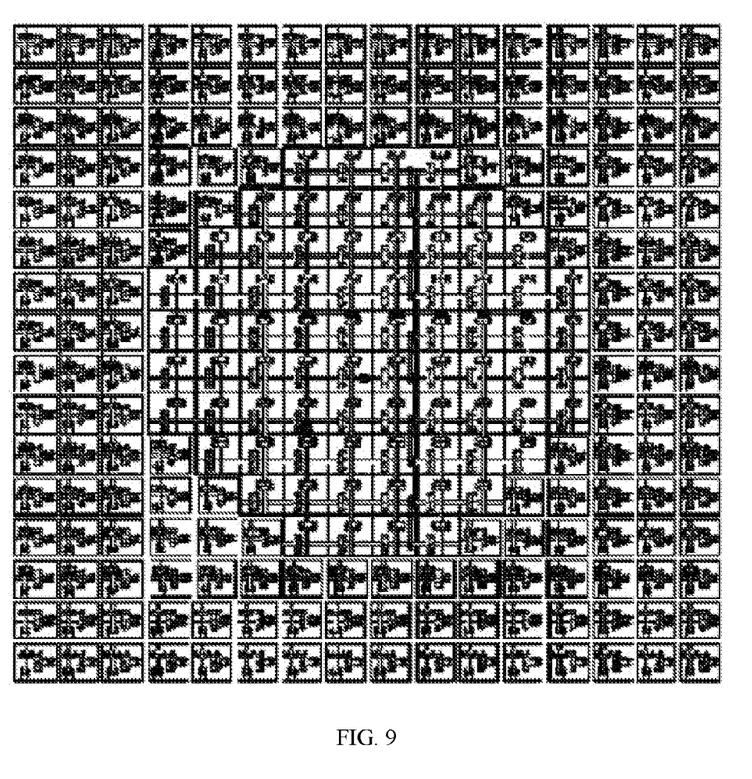
FIG. 9 is a schematic diagram showing the structure of the 16*16 omnidirectional driving base formed by combining the 76-square grids omnidirectional driving base and the 120 single omnidirectional driving modules.

Referring to FIG. 9, in order to expand the omnidirectional driving base 2 and to better move the splicing blocks 4, a plurality of single omnidirectional driving modules can be spliced together at the outside of the omnidirectional driving base 2 to separately drive the splicing blocks 4 to move in each direction. The square grids at the center of the base frame 10 is joined together as a whole to form the splicing floor 1. Each square grid at the periphery of the base frame 10 is individually controlled to drive each splicing block 4 that has been removed.

The manner in which the moving blocks are moved and spliced will now be described.

By means of the passive splicing method, the floor removing/splicing actuator 3 is precisely controlled through the mechanical arm to splice the splicing blocks 4. The floor removing/splicing actuator 3 employs the mechanical arm to pick, remove and splice the splicing blocks 4. The floor portion moving out of the boundary of the splicing floor 1 is removed, and the floor portion that will enter the boundary of the splicing floor 1 is spliced. In this way, the splicing blocks 4 can be recycled, and therefore, the unlimited extension of the splicing floor 1 is achieved. As shown in FIG. 1, this is accomplished by known electro-mechanical automation means, which will not be described further herein.

Figure 10:
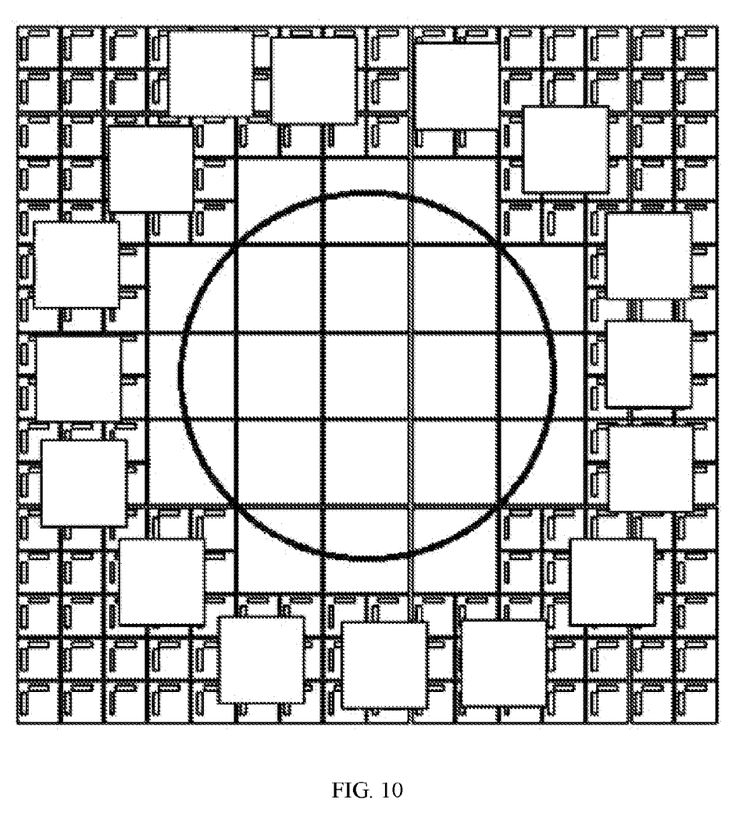
FIG. 10 is a schematic diagram showing the motion of the combined 16*16 omnidirectional driving base and the splicing blocks 4.

By means of the active splicing method, as shown in FIG. 10, when the splicing blocks 4 are spliced by the active method, the floor removing/splicing actuator 3 can be simplified. By precisely controlling each of the omnidirectional wheels 11 of the combined omnidirectional driving base 2, the splicing blocks 4 are delivered to the desired position and the splicing is achieved when a locking command is sent. Alternatively, the mechanical arm can work with the combined omnidirectional driving base to achieve the splicing.

As shown in FIG. 1, the surface layers of different materials are arranged on the surface of each splicing block 4. The surface layers are configured to simulate various ground surfaces and environments (grass, concrete, wooden floor, and others), so that the user can experience different ground effects. Various types of the splicing blocks are combined to stimulate a ground with different surfaces.

It should be noted for those skilled in the art that the embodiments described herein are intended to help the reader understand the implementation of the present invention, and the scope of protection of the present invention is not limited to these special description and embodiments. Other specific modifications and combinations can be made by those skilled in the art based on the technology disclosed by the present invention, and such modifications and combinations shall fall within the scope of protection of the present invention.

What is claimed is:

1. A splicing floor omnidirectional treadmill platform, comprising a splicing floor, an omnidirectional driving base, a floor removing/splicing actuator; wherein, a plurality of omnidirectional wheels are arranged in the omnidirectional driving base; the splicing floor is placed on the plurality of omnidirectional wheels; the splicing floor provides a place for a user to move, and the plurality of omnidirectional wheels of the omnidirectional driving base drive the splicing floor as a whole to move in a direction opposite to a movement direction of the user, enabling the user to experience unlimited free movement while staying at a same position in reality;

the splicing floor is formed by removably coupling a plurality of splicing blocks together the plurality of splicing blocks are connected to form a whole in a vertical direction of the splicing floor and a horizontal direction of the splicing floor; and the floor removing/splicing actuator is installed around the omnidirectional driving base, and is configured to pick, remove and splice the plurality of splicing blocks; the floor removing/splicing actuator is configured to remove a floor portion of the splicing floor moving out a boundary of the splicing floor, and splices the floor portion into the boundary of the splicing floor; the plurality of splicing blocks are recycled to achieve an unlimited extension of the splicing floor.

2. The splicing floor omnidirectional treadmill platform according to claim 1, wherein, the omnidirectional driving base comprises a base frame, the plurality of omnidirectional wheels, shafts, gears, a motor, traction wheels, and a traction belt;

the shafts comprises a plurality of horizontal shafts and a plurality of vertical shafts; the plurality of horizontal shafts and the plurality of vertical shafts are arranged in the base frame are not on the same plane as the horizontal plane of the splicing floor and do not interfere with each other; the plurality of horizontal shafts are parallel to each other and have a same spacing between the plurality of horizontal shafts; the plurality of vertical shafts are parallel and equidistantly arranged, respectively; the plurality of omnidirectional wheels are arranged on the plurality of horizontal shafts and the plurality of vertical shafts; a diameter of the plurality of omnidirectional wheels on the plurality of horizontal shafts is different from a diameter of the plurality of omnidirectional wheels on the plurality of vertical shafts, a highest part of the plurality of omnidirectional wheels is maintained on the same horizontal plane; the gears are arranged, respectively, on a shaft of the plurality of horizontal shafts and one shaft of the plurality of vertical shafts, and the gears are engaged with a motor gear of the motor; the plurality of horizontal shafts and the plurality of vertical shafts are provided with the traction wheels, and the traction wheels are connected to each other by the traction belt; when the gears are driven by the motor to rotate to further drive the traction wheels and the traction belt to rotate, the plurality of vertical shafts and the plurality of horizontal shafts rotate to perform omnidirectional driving.

3. The splicing floor omnidirectional treadmill platform according to claim 2, wherein, the base frame is divided into a plurality of square grids; the plurality of square grids are configured to form the base frame; four sidewalls of each square grid of the plurality of square grid are provided with a respective shaft hole; and the plurality of vertical shafts and the plurality of horizontal shafts are configured to be inserted into the respective shaft holes to strengthen the base frame.

4. The splicing floor omnidirectional treadmill platform according to claim 1, wherein, each splicing block of the plurality of splicing blocks is designed to be a fully locked puzzle graphic; two adjacent splicing blocks of the plurality of splicing blocks are nested together and configured to to be firmly fixed on the horizontal plane;

the adjacent splicing blocks are fixed by a positioning bead; and the positioning bead provides a positioning function in the vertical direction of the splicing floor and the positioning bead provides a weak fixing function in the vertical direction of the splicing floor; and the plurality of splicing blocks are firmly connected in the horizontal direction of the splicing floor;

the plurality of splicing blocks are weakly fixed in the vertical direction of the splicing floor, and the plurality of splicing blocks are configured to be selectively removed and spliced in the vertical direction of the splicing floor.

5. The splicing floor omnidirectional treadmill platform according to claim 1, wherein the each of the plurality of splicing blocks is designed as a square splicing block;

four electrically controlled calipers are installed inside the each of the plurality of splicing blocks, and a clamping post corresponding to each electrically controlled caliper of the four electrically controlled calipers is arranged on each side of the each of the plurality of splicing blocks; when each of the four electrically controlled calipers is open, each of the four electrically controlled calipers is fully retracted inside the respective splicing block; when each of the four electrically controlled calipers is closed, each of the four electrically controlled calipers extends out of the respective splicing block to clamp the clamping post of the respective splicing block corresponding to the clamping post; and the plurality of splicing blocks are fixedly connected in the horizontal direction of the splicing floor and the vertical direction of the splicing floor by the four electrically controlled calipers, and the two adjacent splicing blocks are locked and unlocked by wireless signal control to achieve an operation of removing and splicing of the plurality of splicing blocks; and each of the four electrically controlled calipers comprises a micro-electric push rod, a connector and a caliper head; a head of the micro-electric push rod is connected to the connector, and the connector is connected to the caliper head; the micro-electric push rod drives the connector to move to cause an opening and a closing of the caliper head.

6. The splicing floor omnidirectional treadmill platform according to claim 1, wherein, a plurality of single omnidirectional driving modules are spliced together at an outside of the omnidirectional driving base to separately drive the plurality of splicing blocks to move in each of the horizontal and vertical directions of the splicing floor;

the single omnidirectional driving module comprises a module frame, two omnidirectional wheels, two shafts, gears, a motor; the two shafts comprise a horizontal shaft and a vertical shaft; the horizontal shaft and the vertical shaft are arranged in the base frame and do not interfere with each other; the two omnidirectional wheels are arranged on the two shafts, respectively; highest parts of the two omnidirectional wheels are on a same horizontal plane; the gears are arranged, respectively, on the horizontal shaft and the vertical shaft, and the gears are engaged with a motor gear of the motor; the gears are driven by the motor to rotate to further drive the traction wheel to rotate.

7. The splicing floor omnidirectional treadmill platform according to claim 1, wherein, surface layers of materials are arranged on a surface of each of the plurality of splicing blocks; the surface layers are configured to simulate ground surfaces; types of the plurality of splicing blocks are combined to stimulate a ground with surfaces.

* * * * *